US011127398B2

(12) United States Patent
Xu et al.

(10) Patent No.: US 11,127,398 B2
(45) Date of Patent: Sep. 21, 2021

(54) METHOD FOR VOICE CONTROLLING, TERMINAL DEVICE, CLOUD SERVER AND SYSTEM

(71) Applicant: BAIDU ONLINE NETWORK TECHNOLOGY (BEIJING) CO., LTD., Beijing (CN)

(72) Inventors: Lichao Xu, Beijing (CN); Yushu Cao, Beijing (CN); Lishang Xiao, Beijing (CN); Lifeng Zhao, Beijing (CN); Xiangdong Xue, Beijing (CN); Ji Zhou, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

(*) Notice: Subject to any disclaimer, the term of this patent is extended or adjusted under 35 U.S.C. 154(b) by 56 days.

(21) Appl. No.: 16/236,276

(22) Filed: Dec. 28, 2018

(65) Prior Publication Data
US 2019/0318736 A1 Oct. 17, 2019

(30) Foreign Application Priority Data
Apr. 11, 2018 (CN) .......................... 201810319653.4

(51) Int. Cl.
*G10L 15/22* (2006.01)
*G06F 3/16* (2006.01)
*G10L 15/30* (2013.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC ... G10L 15/30; G10L 15/22; G10L 2015/223; G06F 3/167
(Continued)

(56) References Cited

U.S. PATENT DOCUMENTS 10,303,433 B2 * 5/2019 Suzuki ............... G06K 9/00335
2010/0299590 A1 * 11/2010 Gissler ................... G06F 8/427
715/239
(Continued)

FOREIGN PATENT DOCUMENTS

CN     101464896 A     6/2009
CN     101645064 A     2/2010
(Continued)

OTHER PUBLICATIONS

Wu, Jianying et al., "Research of Application of Voice Signal Processing Technology Based on Cloud Computing Platform" Chinese Academic Journal Electronic Publishing House; (Dec. 2016); p. 112.
(Continued)

*Primary Examiner* — Michael Colucci
(74) *Attorney, Agent, or Firm* — J.C. Patents

(57) ABSTRACT

The embodiment of the disclosure provides a method for voice controlling, a terminal device, a cloud server and a system. The method includes: receiving voice information that the user performs voice controlling on a terminal device; transmitting voice information to the cloud server, so that the cloud server determines, according to the voice information, a voice control and a control instruction that match the voice information in the current interface, and generates a corresponding voice control instruction; receiving the voice control instruction transmitted by the cloud server; and controlling, according to the voice control instruction, a corresponding voice control of the terminal
(Continued)

device to perform an operation. The method of the embodiments of the present disclosure achieves controlling over the controls in the interface through the voice, which deepens the controlling degree of the voice over the terminal device, and improves the user experience.

17 Claims, 10 Drawing Sheets

(58) Field of Classification Search
USPC .......................................................... 704/275
See application file for complete search history.

(56) References Cited

U.S. PATENT DOCUMENTS

| | | | |
|---|---|---|---|
| 2011/0060587 A1* | 3/2011 | Phillips ................... | G10L 15/30 704/235 |
| 2013/0325450 A1* | 12/2013 | Levien .................. | G10L 15/065 704/201 |
| 2015/0170053 A1* | 6/2015 | Miao ....................... | G06N 20/00 706/12 |
| 2016/0104480 A1* | 4/2016 | Sharifi .................... | G10L 15/32 704/254 |
| 2017/0140750 A1* | 5/2017 | Wang .................. | G10L 15/1815 |
| 2018/0227719 A1* | 8/2018 | Chong ................... | H04W 4/20 |

FOREIGN PATENT DOCUMENTS

| | | |
|---|---|---|
| CN | 102036033 A | 4/2011 |
| CN | 103226568 A | 7/2013 |
| CN | 103474068 A | 12/2013 |
| CN | 104899322 A | 9/2015 |
| CN | 105869643 A | 8/2016 |
| CN | 106653006 A | 5/2017 |
| CN | 107451062 A | 12/2017 |
| CN | 107506434 A | 12/2017 |
| CN | 107608652 A | 1/2018 |
| JP | 2006221270 | 8/2006 |
| JP | 2013037689 A | 2/2013 |
| JP | 2015018365 A | 1/2015 |
| JP | 2015095002 A | 5/2015 |
| WO | 2012165112 A1 | 12/2012 |

OTHER PUBLICATIONS

The Chinese First Examination Report of corresponding Chinese application No. 201810319653.4, dated Jan. 17, 2019.
The Chinese Second Examination Report of corresponding Chinese application No. 201810319653.4, dated Apr. 2, 2019.
Office Action of the counterpart Japanese application, dated Feb. 25, 2020.
Refusal decision of the parallel JP application.

* cited by examiner

METHOD FOR VOICE CONTROLLING, TERMINAL DEVICE, CLOUD SERVER AND SYSTEM

CROSS-REFERENCE TO RELATED APPLICATION

This application claims priority to Chinese Patent Application No. 201810319653.4, filed on Apr. 11, 2018, which is hereby incorporated by reference in its entirety.

TECHNICAL FIELD

Embodiments of the present disclosure relate to the field of voice controlling technology, and in particular, to a method for voice controlling, a terminal device, a cloud server, and a system.

BACKGROUND

With the continuous development of science and technology, terminal devices are becoming more and more intelligent, bringing great convenience to people's lives. More and more terminal devices, such as TVs, speakers, refrigerators and on-board center consoles, are equipped with intelligent operating systems. Smart phones that combine functions such as communication, payment, entertainment and learning have become a necessity in people's lives. The user can control terminal devices by means of touching, a button, a remote control, a mouse, and the like.

In many application scenarios, users can't free their hands to control the terminal device. For example, a driver who is driving can't control an on-board center console, it is not convenient for a surgeon who is undergoing surgery to operate a smart medical instrument, and it is not convenient for a user whose hands are full of oil to answer an incoming call, etc. At this time, a more intelligent method for controlling the terminal device is required. With the continuous development of artificial intelligence (AI) technology, especially the continuous development of the voice interaction technology, there have been methods for controlling terminal devices based on voice. For example, a smart phone may be controlled to call a contact person Zhang San in an address book by a voice command "Call Zhang San"; the smart phone may be controlled to open the music player by a voice command "Play Music", or the like.

The existing methods for controlling the terminal device based on the voice can only solve some simple conversational interaction problems, but cannot completely replace operations such as button clicking, list sliding and page turning, text inputting in an input box, which are performed by a user on the terminal device through a finger, a remote controller, a mouse, etc, that is, the method for voice controlling in the prior art has a low controlling degree over the terminal device, cannot meet a user's demand, and has a poor user experience.

SUMMARY

Embodiments of the present disclosure provide a method for voice controlling, a terminal device, a cloud server and a system, which are used to solve the problem in the prior art that the method for voice controlling has a low controlling degree on the terminal device and cannot meet the user's demand.

In a first aspect, the embodiments of the present disclosure provide a method for voice controlling, including:

receiving voice information, the voice information being used for a user to perform the voice controlling on a terminal device;

transmitting the voice information to a cloud server, so that the cloud server determines, according to the voice information, a voice control and a control instruction that match the voice information in a current interface to generate a corresponding voice control instruction;

receiving the voice control instruction transmitted by the cloud server;

controlling, according to the voice control instruction, a corresponding voice control of the terminal device to perform an operation.

In a specific implementation, where, before the transmitting the voice information to the cloud server, the method further includes:

crawling information of voice controls in the current interface after an interface of the terminal device is changed;

transmitting the crawled information of all the voice controls in the current interface to the cloud server.

In a specific implementation, where, the crawling the information of the voice controls in the current interface includes:

obtaining a control structure tree of the current interface, traversing the control structure tree, and obtaining information of the voice controls in the current interface; where the control structure tree includes the information of all voice controls and information of all non-voice controls in the current interface.

In a specific implementation, where, the controlling, according to the voice control instruction, the corresponding voice control of the terminal device to perform the operation includes:

determining, according to the voice control instruction, a voice control and a control instruction for performing the instruction, and triggering a corresponding control action.

In a specific implementation, where, the method further includes:

receiving prompt information transmitted by the cloud server;

prompting the user correspondingly by means of a voice and/or a text, according to the prompt information.

In a second aspect, the embodiments of the present disclosure provide a method for voice controlling, including receiving voice information transmitted by a terminal device, the voice information being used to perform the voice controlling on the terminal device;

determining, according to the voice information, a voice control and a control instruction that match the voice information in a current interface to generate a corresponding voice control instruction;

transmitting the voice control instruction to the terminal device, so that the terminal device controls a corresponding voice control of the terminal device to perform an operation according to the voice control instruction.

In a specific implementation, where, before the receiving the voice information transmitted by the terminal device, the method further includes:

receiving information of all voice controls in the current interface transmitted by the terminal device.

In a specific implementation, where, the method further includes:

determining prompt information, according to the information of the voice control in the current interface;

transmitting the prompt information to the terminal device, so that the terminal device prompts the user correspondingly.

In a third aspect, the embodiments of the present disclosure provide a terminal device, including:

a first receiving module, configured to receive voice information, the voice information being used for a user to perform voice controlling on a terminal device;

a first transmitting module, configured to transmit the voice information to a cloud server, so that the cloud server determines, according to the voice information, a voice control and a control instruction that match the voice information in a current interface to generate a corresponding voice control instruction;

a second receiving module, configured to receive the voice control instruction transmitted by the cloud server;

a control module, configured to control, according to the voice control instruction, a corresponding voice control of the terminal device to perform an operation.

In a specific implementation, further including:

a crawling module, configured to crawl information of voice controls in the current interface after an interface of the terminal device is changed;

the first transmitting module is further configured to transmit the crawled information of all the voice controls in the current interface to the cloud server.

In a specific implementation, where, the crawling module is specifically configured to:

obtain a control structure tree of the current interface, traverse the control structure tree, and obtain information of the voice controls in the current interface, where the control structure tree includes the information of all voice controls and information of all non-voice controls in the current interface.

In a specific implementation, where, the control module is specifically configured to:

determine, according to the voice control instruction, a voice control and a control instruction for performing the instruction, and triggering a corresponding control action.

In a specific implementation, where the second receiving module is further configured to receive prompt information transmitted by the cloud server;

the device further includes a prompt module, configured to prompt the user correspondingly by means of a voice and/or a text, according to the prompt information.

In a fourth aspect, the embodiments of the present disclosure provide a cloud server, including:

a third receiving module, configured to receive voice information transmitted by a terminal device, the voice information being used to perform voice controlling on the terminal device;

a determining module, configured to determine, according to the voice information, a voice control and a control instruction that match the voice information in a current interface to generate a corresponding voice control instruction;

a second transmitting module, configured to transmit the voice control instruction to the terminal device, so that the terminal device controls a corresponding voice control of the terminal device to perform an operation according to the voice control instruction.

In a specific implementation, where, the third receiving module is further configured to:

receive information of all voice controls in the current interface transmitted by the terminal device before the receiving the voice information transmitted by the terminal device.

In a specific implementation, where:

the determining module is further configured to determine prompt information according to the information of the voice control in the current interface;

the second transmitting module is further configured to transmit the prompt information to the terminal device, so that the terminal device prompts the user correspondingly.

In a fifth aspect, the embodiments of the present disclosure provide a terminal device, including:

a memory;
a processor; and
a computer program;
where the computer program is stored in the memory, and configured to be executed by the processor to implement the method of the first aspect as described above.

In a sixth aspect, the embodiments of the present disclosure provide a cloud server, including:

a memory;
a processor; and
a computer program;
where the computer program is stored in the memory, and configured to be executed by the processor to implement the method of the second aspect as described above.

In a seventh aspect, the embodiments of the present disclosure provide a system for voice controlling, including:

at least one terminal device of the third aspect as described above;
at least one cloud server of the forth as described above.

In an eighth aspect, the embodiments of the present disclosure provide a system for voice controlling, where the computer program is executed by a processor to implement the method of any one of the first aspect and the second aspect as described above.

The method for voice controlling, the terminal device, the cloud server and the system are provided by the embodiments of the present disclosure, wherein the voice information used for the user to perform voice controlling on a terminal device is transmitted to the cloud server; the voice control instruction generated by the cloud server is received, where the cloud server determines, according to the voice information, a voice control and a control instruction that match the voice information in a current interface to generate the voice control instruction; and according to the voice control instruction, a corresponding voice control of the terminal device is controlled to perform an operation, thus realizing the controlling over the terminal device by the voice; especially, the control operation in the voice controlling interface replaces operations such as button clicking, list sliding and page turning, text inputting in the input box by the user on the terminal device through the finger, remote controller, mouse, etc., thereby improving the controlling degree of the voice over the terminal device, and improving the response speed and the controlling accuracy of the voice controlling relying on the powerful processing capability of the cloud server.

BRIEF DESCRIPTION OF DRAWINGS

The accompanying drawings herein are incorporated in and constitute a part of the specification, show embodiments according to the present disclosure, and illustrate the principles of the present disclosure in conjunction with the specification.

The embodiments of the present disclosure have been shown through the foregoing drawings and are described in detail in the below. The drawings and the written description are not intended to limit the scope of the present disclosure in any way, but illustrating the concept of the present disclosure for those skilled in the art by referring to the specific embodiments.

DESCRIPTION OF EMBODIMENTS

Exemplary embodiments will be described in detail herein, examples thereof are illustrated in the accompanying drawings. Same numbers in different figures represent the same or similar elements, unless otherwise indicated. Implementations described in the following exemplary embodiments do not represent all implementations consistent with the present disclosure. Instead, they are merely examples of devices and methods consistent with some aspects of the present disclosure as detailed in the appended claims.

The terms "comprising" and "having" and any their variations in the specification and claims of the present disclosure are intended to cover a non-exclusive inclusion. For example, a process, method, system, product or device that comprises a series of steps or units is not limited to steps or units that are listed, but optionally also includes steps or units that are not listed, or optionally includes other steps or units inherent to the process, method, system, product or device.

The terms "first" and "second" in the present disclosure are used for identification purposes only, and are not to be construed as indicating or implying a sequential relationship, relative importance, or implicitly showing the number of technical features indicated. "Multiple" means two or more. "And/or", which describes an association relationship of associated objects, indicates that there may be three kinds of relationships, for example, A and/or B indicates that there may be three cases: only A exists; A and B exist at the same time; and only B exists. The character "/" generally indicates that there is an "or" relationship between the contextual objects.

The "one embodiment" or "an embodiment" referred to throughout the specification of the present disclosure means that a particular feature, structure or characteristic relating to the embodiment is included in at least one embodiment of the present application. Thus, "in one embodiment" or "in an embodiment" as used throughout the specification does not necessarily refer to the same embodiment. It should be noted that the embodiments of the present disclosure and the features of the embodiments may be combined with each other if they are not conflicting.

Figure 1:
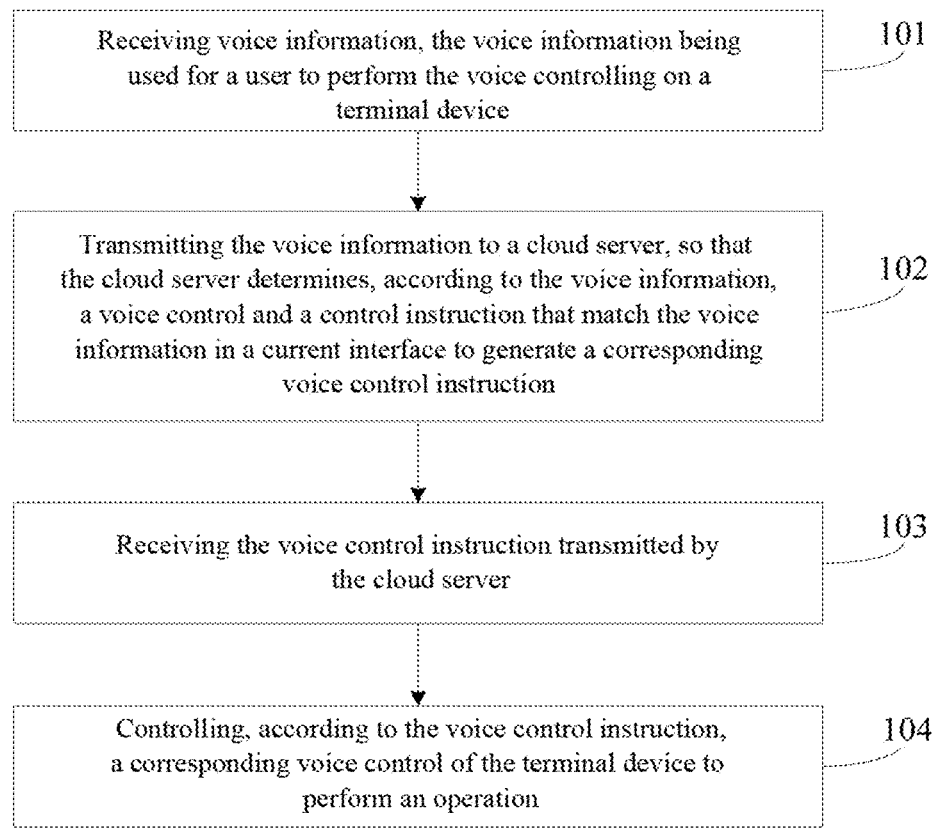
FIG. 1 is a flowchart of a method for voice controlling provided by an embodiment of the present disclosure.

FIG. 1 is a flowchart of a method for voice controlling provided by an embodiment of the present disclosure. The executing entity of the method may be a terminal device, including but not limited to a smart phone, a tablet computer, a computer device, a smart home appliance, an on-board center console, etc., which is not limited in this embodiment. As shown in FIG. 1, the method for voice controlling provided by this embodiment may include:

Step 101: receiving voice information, the voice information being used for a user to perform the voice controlling on a terminal device.

The voice information used for the user to perform the voice controlling on the terminal device may be collected by a microphone (mic) of the terminal device, or may be obtained by converting according to a corresponding voice audio file.

The voice information used for the user to perform the voice controlling on the terminal device may include a control to be operated and a corresponding operation instruction. For example, there are three button controls in a photo browsing interface, which respectively are zoom-in, zoom-out and deleting the photo, and voice information "single click the zoom-in button" may be used to achieve a zoom-in operation of a photo instead of touching the zoom-in button on the screen by a finger of the user. This is only for illustration. The voice information used for the user to perform the voice controlling on the terminal device may be determined according to a control included in an interface and a corresponding operation supported by the control.

Optionally, for the terminal device that supports the voice controlling, in order to avoid that the microphone is always powered on which results in an increase in power consumption of the terminal device, an option of whether to turn on a voice controlling function may be added in the settings, where the default setting is off. Only when the user turns on the voice controlling function, the microphone is turned on to collect the voice information for the user to perform the voice controlling on the terminal device.

Step 102: transmitting the voice information to a cloud server, so that the cloud server determines, according to the voice information, a voice control and a control instruction that match the voice information in a current interface to generate a corresponding voice control instruction.

When the voice information used for the user to perform the voice controlling on the terminal device is transmitted to the cloud server, the voice control and the control instruction matching the voice information in the current interface can be quickly and accurately obtained to generate the corresponding voice control instruction relying on a powerful processing capability of the cloud server. The voice information may be transmitted to the cloud server in a wired and/or wireless manner, which is not limited in this embodiment. The voice information used for the user to perform the voice controlling on the terminal device may be encapsulated according to a communication protocol between the terminal device and the cloud server, and then transmitted to the cloud server, which is not limited in this embodiment.

The voice control in this embodiment has a voice interaction capability, and can perform a corresponding operation on the control through the voice. The voice control includes but is not limited to:

a voice button control, which may control, through the voice, an operation of a button, such as click, long press, double click;

a voice list control, which may control, through the voice, an operation of a list, such as scroll up and down, click a specific option, long press, double click;

a voice link control, which may achieve, through the voice, a function of opening a page corresponding to a link in a browser;

a voice radio control, which may achieve, through the voice, a function of selecting an option;

a voice input box control, which may achieve, through the voice, a function of inputting a text in an input box;

a voice tab control, which may control, through the voice, switching of tabs;

a voice custom control, which is a control, provided for a third-party developer, that may customize voice interaction information, facilitating for the third-party developer to develop a customized function.

Optionally, if there is no voice control that matches the voice information in the current interface, the cloud server may transmit information that the matching fails to the terminal device. The terminal device may prompt the user by a voice and/or a text according to the information that the matching fails. For example, the user may be prompted to "Please re-input the voice information".

Optionally, if there is no voice control that matches the voice information in the current interface, the cloud server may further generate corresponding prompt information according to information of the voice controls in the current interface, and transmit the corresponding prompt information to the terminal device. The terminal device may prompt the user by a voice and/or a text according to the prompt information. For example, the user may be prompted to "Please try clicking the zoom-in button".

Usage habits of users vary widely. Still taking the photo browsing interface as an example, for a same intention of achieving enlarging a photo through voice controlling instead of touching a button for enlarging a photo on a screen with a finger, but received voice information may be "Click zoom-in button", "Touch zoom-in button", "Click on zoom-in button", "Enlarge photo", "Increase photo", and the like. In order to improve flexibility of the matching to avoid the problem of poor user experience caused by high matching failure rate, the cloud server determines the voice control and the control instruction that match the voice information in the current interface according to the voice information, which may specifically include:

The cloud server first generalizes information of all voice controls in the current interface based on semantics, and then uses a fuzzy matching method to match the received voice information with the voice controls in the current interface.

Step 103: receiving the voice control instruction transmitted by the cloud server.

Step 104: controlling, according to the voice control instruction, a corresponding voice control of the terminal device to perform an operation.

The voice control instruction transmitted by the cloud server includes the voice control and the control instruction information matching the voice information, so that the voice control and the control instruction for executing the instruction can be determined according to the voice control instruction, and the corresponding control behavior may be triggered to implement the voice controlling on the terminal device, thereby replacing operations such as button click, list slid and page turn, text input in an input box by the user on the terminal device through the finger, remote controller, mouse, etc.

In the method for voice controlling provided by this embodiment, the voice information used for the user to perform voice controlling on a terminal device is transmitted to the cloud server; the voice control instruction generated by the cloud server is received, where the cloud server determines, according to the voice information, a voice control and a control instruction that match the voice information in a current interface to generate the voice control instruction; and according to the voice control instruction, a corresponding voice control of the terminal device is controlled to perform an operation, thus realizing the controlling over the terminal device by the voice; especially, the control operation in the voice controlling interface replaces operations such as button clicking, list sliding and page turning, text inputting in the input box by the user on the terminal device through the finger, remote controller, mouse, etc., thereby improving the controlling degree of the voice over the terminal device, and improving the response speed and the controlling accuracy of the voice controlling relying on the powerful processing capability of the cloud server, therefore the user experience is improved.

On the basis of the previous embodiment, in order to improve the scalability, before transmitting the voice information to the cloud server, the method for the voice controlling provided by this embodiment may further include:

crawling information of voice controls in the current interface after an interface of the terminal device is changed, and transmitting the crawled information of all voice controls in the current interface to the cloud server.

Where, the change of the interface of the terminal device may be an interface jump, that is, the interface jumps from an interface A to an interface B, such as jumping from an address book interface to a short message interface in a smart phone; or may be a change of a control in the interface, such as a radio control in the interface is selected, a tab control in the interface is switched, new text information is inputted into an input box control. Information of the voice control may include all relevant information of the voice control, such as a category of the voice control, a supported operation mode, a function in the current interface, a description of the voice information.

Whenever the interface of the terminal device is changed, information of the voice controls in the changed current interface is re-crawled and transmitted to the cloud server, so that the information of the voice controls obtained by the cloud server is synchronized with the terminal device.

Optionally, the crawled voice control information may be encapsulated according to a preset communication protocol, and then the encapsulated voice control information may be transmitted to the cloud server, so that the cloud server can correctly parse the information to obtain the information of the voice controls in the current interface.

Optionally, the following method may be used for the crawling the information of the voice controls in the current interface:

obtaining a control structure tree of the current interface, traversing the control structure tree, and obtaining information of the voice controls in the current interface; wherein the control structure tree comprises the information of all voice controls and information of all non-voice controls in the current interface.

There are multiple methods for obtaining the control structure tree of the current interface, which is not limited in this embodiment. As an optional manner of this embodiment, an xml-structured file may be obtained through a dump manner, where the xml-structured file contains an overall structure of the current interface, and the xml-structured file is composed of an layout control and a user interface control, and the control structure tree of the current interface may be obtained by parsing the obtained xml-structured file.

The control structure tree may include the information of all voice controls that support the voice operation in the current interface and information of all non-voice controls, for example, a control that only supports a displayed text box. A strategy traversal is performed on the nodes of the control structure tree to obtain information of the voice controls in the current interface. The obtained information of the voice control may be added to a temporary array, and the information of all the voice controls in the temporary array may be analyzed, for example, some useless information may be filtered out.

The method for the voice controlling provided by this embodiment, by crawling information of the voice control in the current interface after the interface of the terminal device is changed, and transmitting the information to the cloud server, the information of the voice controls obtained by the cloud server can be synchronized with the terminal device, and there is no need to artificially specify an interface voice interaction scheme in advance, for example, that voice information may be supported by which controls, and which interfaces those controls are in. Even if an adjustment of the control occurs in the interface, for example, in the case of product upgrade, troubleshooting, or the like, the method for the voice controlling provided by this embodiment can automatically reconfigure the changed control without requiring a change for adaptation by the cloud server again, thus the entire process is fully automated. The method for the voice controlling provided by this embodiment expands the use scenario of the voice controlling and improves the use experience.

Figure 2:
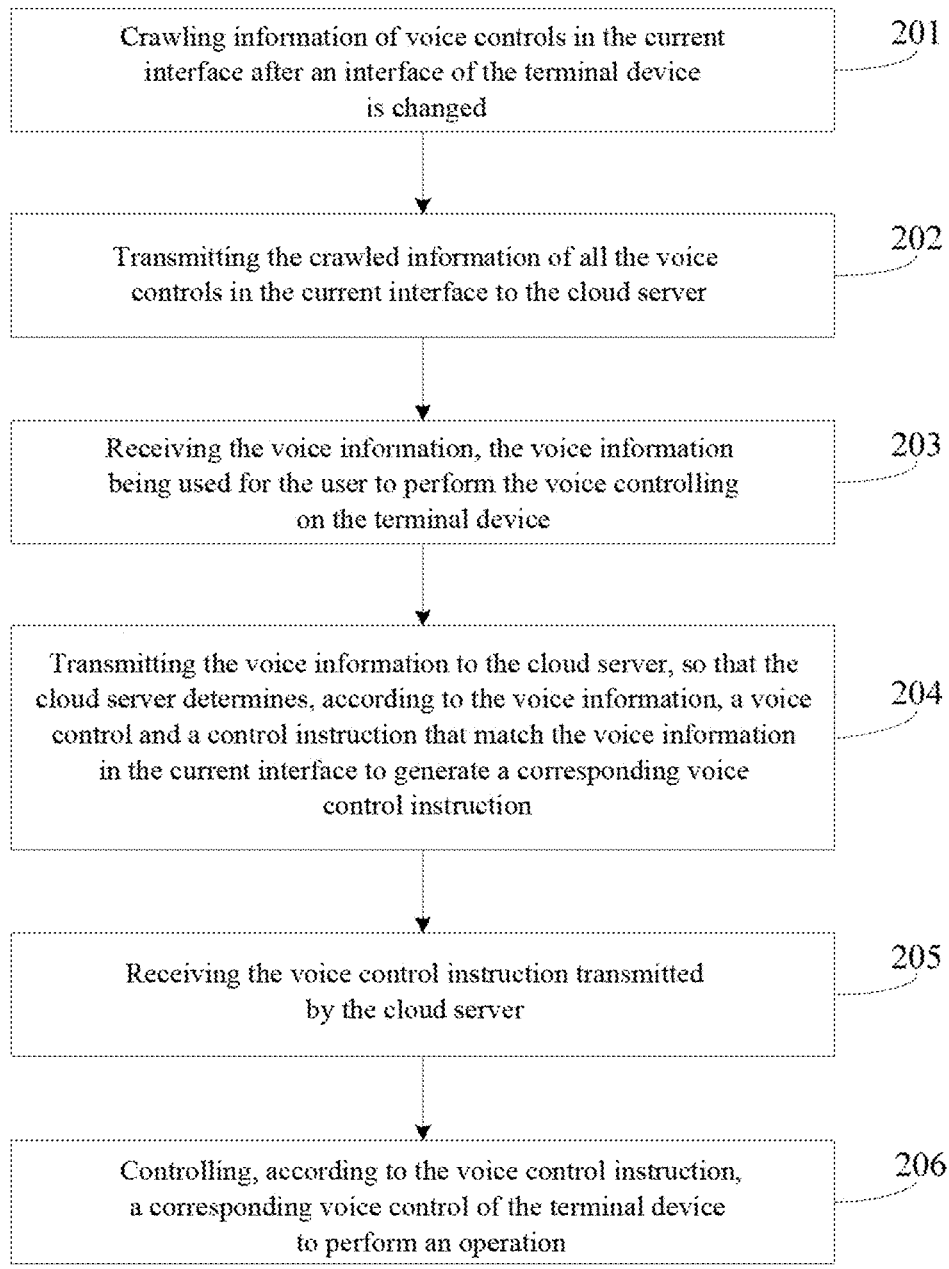
FIG. 2 is a flowchart of a method for voice controlling provided by another embodiment of the present disclosure.

On the basis of the above embodiments, the above embodiments are combined by this embodiment. Embodiments of the present disclosure further provide a method for voice controlling. Referring to FIG. 2, FIG. 2 is only used as an example for illustrating this embodiment of the present disclosure, and the present disclosure is not limited thereto. FIG. 2 is a flow chart of the method for voice controlling provided by another embodiment of the present disclosure. As shown in FIG. 2, the method for the voice controlling provided in this embodiment may include the following steps:

Step 201: crawling information of voice controls in a current interface after an interface of the terminal device is changed.

Step 202: transmitting the crawled information of all the voice controls in the current interface to the cloud server.

Step 203: receiving voice information, the voice information being used for a user to perform the voice controlling on a terminal device.

Step 204: transmitting the voice information to the cloud server, so that the cloud server determines, according to the voice information, a voice control and a control instruction that match the voice information in a current interface to generate a corresponding voice control instruction.

Step 205: receiving the voice control instruction transmitted by the cloud server.

Step 206: controlling, according to the voice control instruction, a corresponding voice control of the terminal device to perform an operation.

The method for voice control provided by the embodiment, by crawling information of the voice controls in the current interface after the interface of the terminal device is changed, and transmitting the information to the cloud server, the information of the voice controls obtained by the cloud server can be synchronized with the terminal device, and the voice information used for the user to perform voice controlling on a terminal device is transmitted to the cloud server; the voice control instruction generated by the cloud server is received, where the cloud server determines, according to the voice information, a voice control and a control instruction that match the voice information in a current interface to generate the voice control instruction; and according to the voice control instruction, a corresponding voice control of the terminal device is controlled to perform an operation, thus realizing the controlling over the terminal device by the voice; especially, the control operation in the voice controlling interface replaces operations such as button clicking, list sliding and page turning, text inputting in the input box by the user on the terminal device through the finger, remote controller, mouse, etc., thereby improving the controlling degree of the voice over the terminal device, and improving the response speed and the controlling accuracy of the voice controlling relying on the powerful processing capability of the cloud server.

On the basis of any one of the above embodiments, in order to further improve the user experience, to standardize the voice information used for the user to perform voice controlling on the terminal device, and to improve the accuracy of the voice controlling, the method for the voice controlling provided by this embodiment may further include:

receiving prompt information transmitted by the cloud server, and prompting the user correspondingly by means of a voice and/or a text, according to the prompt information.

The prompt information is generated by the cloud server according to the information of the voice control in the current interface. For example, for a voice list control, prompt information "Try scrolling up list" may be generated; for a voice tab control with three tabs of contact, message board and album, prompt information "Try switching to message board" may be generated. After receiving the prompt information, the terminal device may display the prompt information by means of a text on the current interface, or may perform voice broadcast through a speaker of the terminal device for prompting the user.

Optionally, if there are multiple voice controls in the current interface, the prompt information may be generated for a most frequently used voice control according to the user's usage habit.

Optionally, the prompt information may also be generated by the cloud server according to information of the voice control in the current interface when there is no voice control that matches the voice information used for the user to perform voice controlling on the terminal device in the current interface. In a possible implementation, the cloud server may analyze the voice information used for the user to perform voice controlling on the terminal device and the voice control information in the current interface, and generates the prompt information in terms of the voice control with the highest degree of matching with the voice information used for the user to perform voice controlling on the terminal device.

In the method for voice controlling provided by this embodiment, the received prompt information transmitted by the cloud server is displayed by means of a voice and/or a text to the user to prompt the user, thereby standardizing the voice information used for the user to perform voice controlling on the terminal device, improving the accuracy of the voice controlling, and further improving the user experience.

Figure 3A:
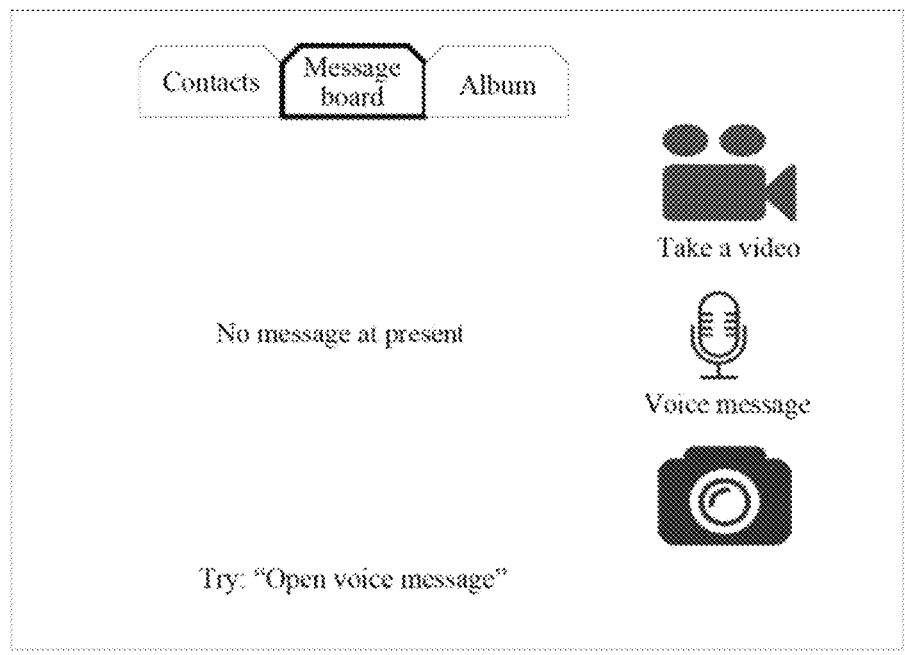
FIG. 3A and FIG. 3B are schematic diagrams of interfaces of a method for voice controlling provided by a further embodiment of the present disclosure.
Figure 3B:
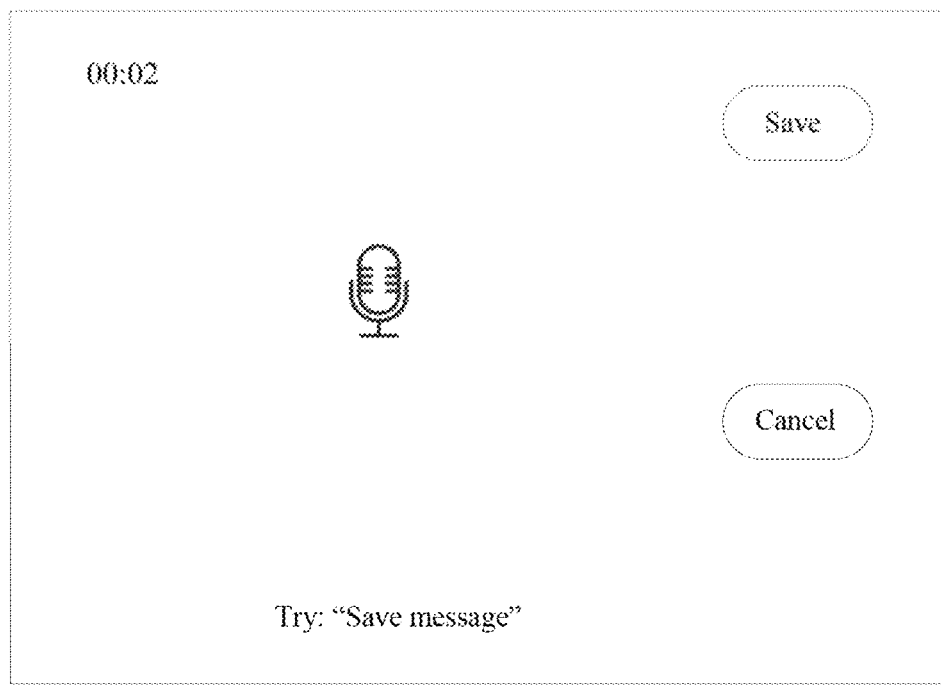

On the basis of the above embodiments, the method for voice controlling provided by the embodiment of the present disclosure is described in detail below through a specific embodiment. Referring to FIG. 3, FIG. 3 is only used as an example for illustrating this embodiment of the present disclosure, and the present disclosure is not limited thereto. FIG. 3A and FIG. 3B are schematic diagrams of interfaces of a method for voice controlling provided by a further embodiment of the present disclosure.

In this embodiment, a user interface (UI) crawler can be understood as an apparatus in a terminal device, and it is implemented by software and/or hardware and configured to obtain the voice control information in the terminal device interface. A distribution engine can be understood as an apparatus in the terminal device, and it is implemented by software and/or hardware and configured to achieve a function for information upstream and downstream between the terminal device and the cloud server.

When the user opens a message board application, the terminal device displays an interface as shown in FIG. 3A. It can be jumped from another interface to this interface, or it can be switched to this interface through a tab control in this interface. No matter the interface is entered by jumping form another interface or switched by the control, the UI crawler will obtain information that the interface is changed and crawl the information of the voice controls in the current interface. Specifically, the information of all voice controls can be obtained by traversing the control structure tree of the current interface. As shown in FIG. 3A, the interface includes a voice tab control with three tabs of contact, message board and album, a voice button control for taking a video, a voice button control for a voice message, a voice button control for taking a photo and a text control for displaying "No message at present". The UI crawler is only concerned with the information of the voice controls, that is, the UI crawler only obtains information related to one voice tab control and the three voice button controls, such as description information of each control, supported operations, implemented functions, and the like. The UI crawler transmits the information of all the crawled voice controls to the distribution engine, and the distribution engine encapsulates the information according to the preset communication protocol and delivers the information to the cloud server. It can be seen that the process can be automated through the UI crawler without artificially specifying the voice interaction scheme of the controls in the interface in advance.

The cloud server may generate the corresponding prompt information according to the received voice control information in the current interface. For example, for the interface shown in FIG. 3A, the prompt information may be "Switch to contact", "Switch to album", "Open message board", "Turn on camera", "Take video", and the like. The cloud server can determine, by analyzing, the most frequently performed operation on the message board interface is "Open message board". Therefore, the cloud serer may only transmit the prompt information "Open voice message" to the terminal device, so that the terminal device correspondingly prompts the user according to the prompt information. For example, as shown in FIG. 3A, the terminal device may prompt the user by displaying a text on the interface, and the terminal device may prompt the user through voice broadcast. The above processing procedures are performed in the background, and it can be considered that the user can see the interface as shown in FIG. 3 after opening the message board application.

When the terminal device is in the interface shown in FIG. 3A, if the user says "Switch to contact", the terminal device will switch to the contact interface, and if the user says "Take photo", the terminal device will open the camera. The following is described with an example of opening a voice message. When the user says "Open voice message", the microphone of the terminal device collects this voice information, and transmits the voice information to the cloud server through a communication component. After receiving the voice information, the cloud server first recognizes the voice information as corresponding text information, and then matches it with the information of the voice control in the current interface. When the matching degree with a certain voice control is higher than a preset value, it is determined that the voice control is a voice control that matches the voice information. For FIG. 3A, the voice control matching the voice information "Open voice message" is a voice button control of the voice message, and the control instruction is click. The cloud server feeds back the generated voice control instruction to the terminal device. The voice control instruction is parsed and distributed to the voice button control of the voice message by the distribution engine. The voice button control responds to the control instruction of click, and then the interface jumps to an interface shown in FIG. 3B.

At this point, the interface is changed again, and the UI crawler will continue to crawl the information of the voice controls in the interface shown in FIG. 3B. The subsequent execution process is similar to the above process and will not be described here again.

On the basis of any of the above embodiments, in order to improve the security of voice controlling and prevent an illegal user from performing voice controlling on the terminal device, before controlling the corresponding voice control of the terminal device to perform an operation according to the voice control instruction, the method for the voice controlling provided by this embodiment may also include:

determining voiceprint information according to the voice information used for the user to perform voice controlling on the terminal device, matching the voiceprint information with preset voiceprint information, and controlling a corresponding voice control of the terminal device to perform the operation according to the voice control instruction only when the matching is successful.

The determining the voiceprint information and the matching the voiceprint information with the preset voiceprint information may be performed by the terminal device or by the cloud server, which is not limited in this embodiment.

This embodiment provides a method for voice controlling of high-security, which can be applied to scenarios with high security requirements. Under the premise of ensuring security, both the degree of control by voice over the terminal device and the user experience may be improved.

Figure 4:
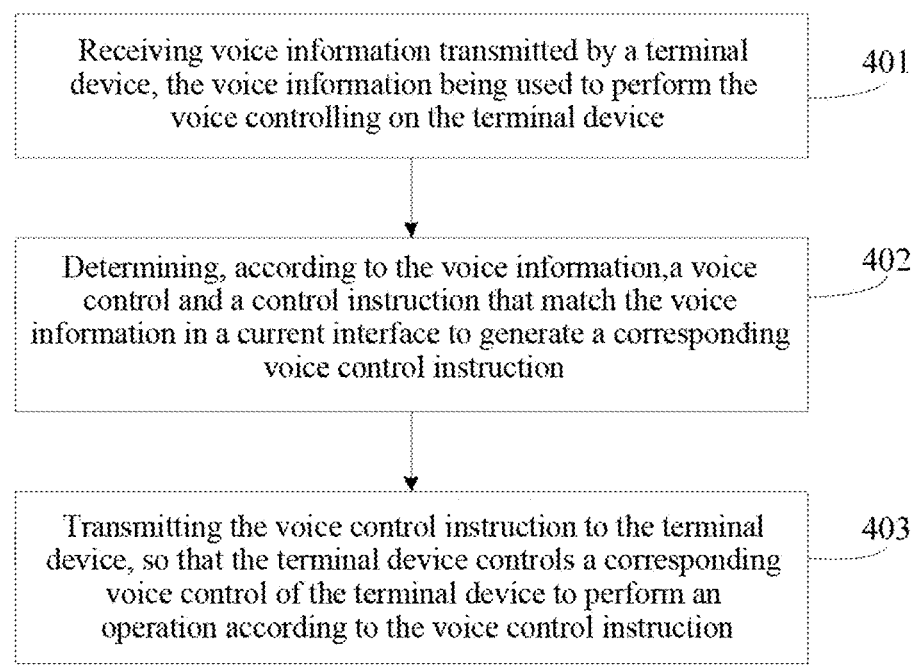
FIG. 4 is a flowchart of a method for voice controlling provided by still another embodiment of the present disclosure.

FIG. 4 is a flowchart of a method for voice controlling provided by still another embodiment of the present disclosure. The execution entity of the method may be a cloud server. As shown in FIG. 4, the method for voice controlling provided by this embodiment may include:

Step 401: receiving voice information transmitted by a terminal device, the voice information being used to perform the voice controlling on the terminal device.

Step 402: determining, according to the voice information, a voice control and a control instruction that match the voice information in a current interface to generate a corresponding voice control instruction.

Optionally, the cloud server may first recognize the received voice information as corresponding text information, and then match the text information with the text description information of the voice control in the current interface. Alternatively, the cloud server may also directly match the received voice information with the audio description information of the voice control in the current interface, which is not limited in this embodiment.

Optionally, in order to improve the accuracy of the matching, the cloud server may first generalize the information of all voice controls in the current interface based on semantics, and then use a fuzzy matching method to match the received voice information with the voice control in the current interface.

Step 403: transmitting the voice control instruction to the terminal device, so that the terminal device controls a corresponding voice control of the terminal device to perform an operation according to the voice control instruction.

In the method for voice controlling provided by this embodiment, the voice control and the control instruction that match the voice information in the current interface may be determined according to the voice information to generate the voice control instruction, and the corresponding voice control of the terminal device is controlled to perform the operation, thereby improving the controlling degree of the voice over the terminal device, improving the response speed and the controlling accuracy of the voice controlling relying on the powerful processing capability of the cloud server, and further improving the user experience.

Optionally, before the voice information transmitted by the terminal device is received, the information of all voice controls in the current interface transmitted by the terminal device may also be received, so that the information of the voice control obtained by the cloud server is synchronized with the terminal device.

Optionally, the above method may further include:
determining prompt information, according to information of the voice control in the current interface, and transmitting the prompt information to the terminal device, so that the terminal device prompts the user correspondingly. The voice information used for the user to perform voice controlling on the terminal device can be standardized by the prompting, thereby improving the accuracy of voice controlling.

Figure 5:
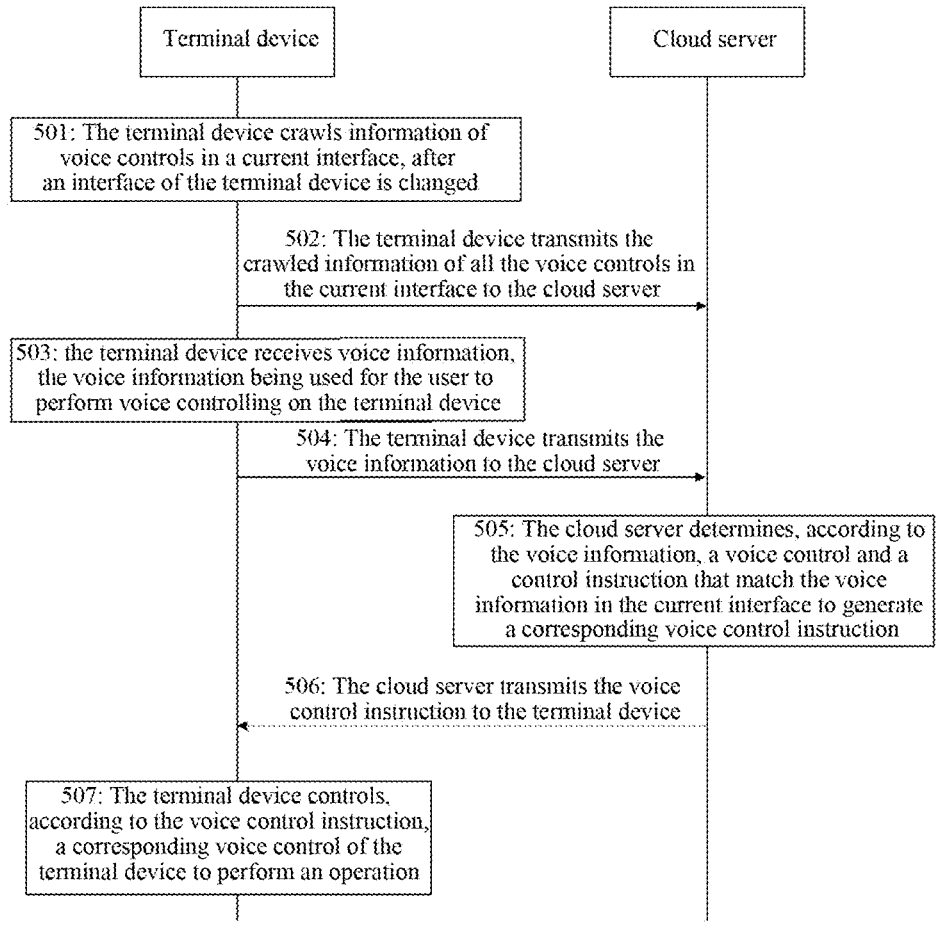
FIG. 5 is an interaction flowchart of a method for voice controlling provided by an embodiment of the present disclosure.

Embodiments of the present disclosure further provides a method for voice controlling. Referring to FIG. 5, which is only used as an example for illustrating this embodiment of the present disclosure, and the present disclosure is not limited thereto. FIG. 5 is an interaction flowchart of a method for voice controlling provided by an embodiment according to the present disclosure. This embodiment provides a flow of a terminal device interacting with a cloud server to achieve voice controlling. As shown in FIG. 5, the method for the voice controlling provided in this embodiment may include:

Step 501: the terminal device crawls information of voice controls in a current interface, after an interface of the terminal device is changed.

After an interface is changed, for example, an interface jump occurs, the controls in the interface change, the terminal device crawls information of the voice controls in the current interface. For example, the information of the voice controls in the current interface may be obtained by traversing a control structure tree of the current interface.

Step 502: the terminal device transmits the crawled information of all the voice controls in the current interface to the cloud server.

Every time after the interface is changed, the terminal device transmits the crawled information of the voice control in the current interface to the cloud server, so that the information of the voice controls obtained by the cloud server is synchronized with the terminal device.

Step 503: the terminal device receives voice information, the voice information being used for a user to perform voice controlling on the terminal device;

The terminal device obtains voice information that the user performs voice controlling on the terminal device through a sound collection device such as a microphone (mike).

Step 504: the terminal device transmits the voice information to a cloud server.

Step 505: the cloud server determines, according to the voice information, a voice control and a control instruction that match the voice information in a current interface to generate a corresponding voice control instruction.

Step 506: the cloud server transmits the voice control instruction to the terminal device.

Step 507: the terminal device controls, according to the voice control instruction, a corresponding voice control of the terminal device to perform an operation.

The steps in this embodiment may be implemented with reference to the technical solutions described in any one of the above method embodiments, which will not be described here again.

In the method for voice controlling provided by this embodiment, the information of the voice controls in the current interface is crawled after the interface of the terminal device is changed, and the information is transmitted to the cloud server, so that the information of the voice controls obtained by the cloud server can be synchronized with the terminal device. The voice information used for the user to perform voice controlling on a terminal device is transmitted to the cloud server, the cloud server determines, according to the voice information, a voice control and a control instruction that match the voice information in a current interface to generate the voice control instruction; and according to the voice control instruction, the terminal device controls a corresponding voice control of the terminal device to perform an operation, thus realizing the controlling over the terminal device by the voice; especially, the control operation in the voice controlling interface replaces operations such as button clicking, list sliding and page turning, text inputting in the input box by the user on the terminal device through the finger, remote controller, mouse, etc., thereby improving the controlling degree of the voice over the terminal device, and improving the response speed and the controlling accuracy of the voice controlling relying on the powerful processing capability of the cloud server.

Figure 6:
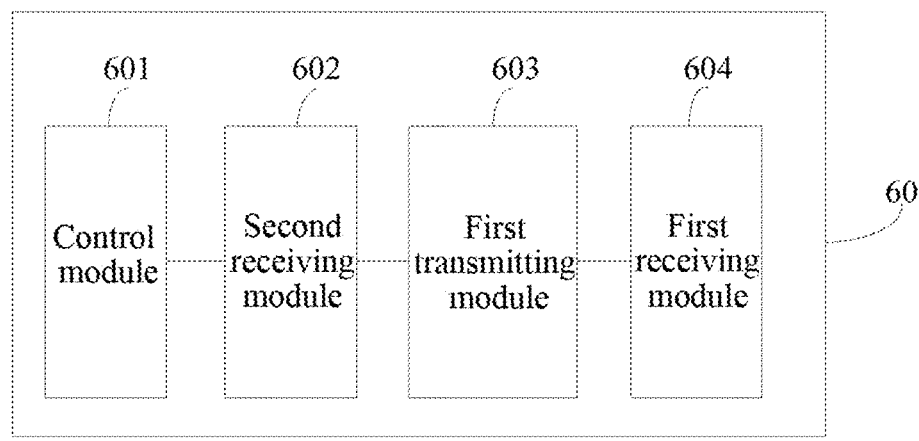
FIG. 6 is a schematic structural diagram of a terminal device provided by an embodiment of the present disclosure.

Embodiments of the present disclosure further provide a terminal device. Referring to FIG. 6, which is only used as an example for illustrating this embodiment of the present disclosure, and the present disclosure is not limited thereto.

FIG. 6 is a schematic structural diagram of a terminal device provided by an embodiment according to the present disclosure. As shown in FIG. 6, a terminal device 60 provided in this embodiment may include: a first receiving module 601, a first transmitting module 602, a second receiving module 603 and a controlling module 604.

The first receiving module 601 is configured to receive voice information, the voice information being used for a user to perform voice control on a terminal device;

The first transmitting module 602 is configured to transmit the voice information to a cloud server, so that the cloud server determines, according to the voice information, a voice control and a control instruction that match the voice information in a current interface to generate a corresponding voice control instruction;

The second receiving module 603 is configured to receive the voice control instruction transmitted by the cloud server.

The controlling module 604 is configured to control, according to the voice control instruction, a corresponding voice control of the terminal device to perform an operation.

The terminal device provided by this embodiment may be used to implement the technical solutions of the method embodiment corresponding to FIG. 1, and the implementation principles and technical effects of the terminal device provided by this embodiment are similar to those of the method embodiment corresponding to FIG. 1, which will not be described here again.

Optionally, the terminal device may further include:
a crawling module, configured to crawl information of voice controls in the current interface after an interface of the terminal device is changed. At this point, the first transmitting module is further configured to transmit the crawled information of all voice controls in the current interface to the cloud server.

Optionally, the crawling module is specifically configured to obtain a control structure tree of the current interface, traverse the control structure tree, and obtain information of the voice controls in the current interface; where the control structure tree includes the information of all voice controls and information of all non-voice controls in the current interface.

Optionally, the controlling module is specifically configured to determine, according to the voice control instruction, a voice control and a control instruction for performing the instruction, and trigger a corresponding control action.

Optionally, the second receiving module is further configured to receive prompt information transmitted by the cloud server, and the terminal device may further include a prompt module, which is configured to prompt the user correspondingly by means of a voice and/or a text, according to the prompt information.

The terminal device provided by this embodiment may be used to implement the technical solutions of the method embodiments corresponding to FIGS. 1 to 3, and the implementation principles and technical effects thereof are similar, which will not be described here again.

Figure 7:
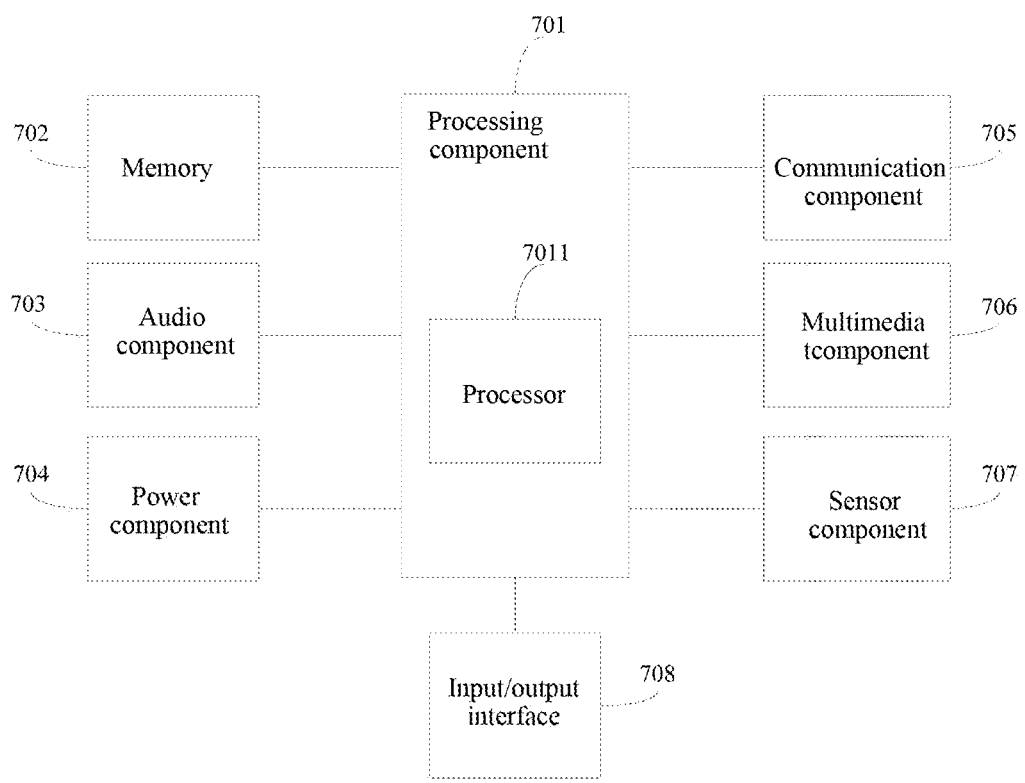
FIG. 7 is a schematic structural diagram of a terminal device provided by another embodiment of the present disclosure.

The embodiments of the present disclosure further provide a terminal device. Referring to FIG. 7, which is only used as an example for illustrating this embodiment of the present disclosure, and the present disclosure is not limited thereto. FIG. 7 is a schematic structural diagram of a terminal device provided by another embodiment of the present disclosure. The terminal device may be a mobile phone, a computer, a digital broadcast terminal, a message transceiving device, a game console, a tablet device, a medical device, a fitness device, a personal digital assistant, or the like. As shown in FIG. 7, the terminal device provided by this embodiment may include one or more of the following components: a processing component 701, a memory 702, a power component 704, a multimedia component 706, an audio component 703, an input/output (I/O) interface 708, sensor component 707, and communication component 705.

The processing component 701 generally controls an overall operation of the terminal device, such as operations associated with displaying, telephone calls, data communication, camera operations, and recording operations. The processing component 701 may include one or more processors 7011 configured to execute the instruction, to implement all or part of the steps of the above described methods. Moreover, the processing component 701 may include one or more modules configured to facilitate interaction between the processing component 701 and other components. For example, the processing component 701 may include a multimedia module to facilitate interaction between the multimedia component 706 and the processing component 701.

The memory 702 is configured to store various types of data to support the operation at the terminal device. Examples of such data include instructions for any application or method operating on the terminal device, contact data, phone book data, a message, a picture, a video, and the like. The memory 702 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or optical disk. In this embodiment, the memory 702 has a computer program stored therein, and the computer program may be executed by the processor 7011 to implement the technical solutions of the method embodiments corresponding to FIG. 1 to FIG. 3.

The power component 704 is configured to provide power to various components of the terminal device. The power component 704 can include a power management system, one or more power sources and other components associated with generating, managing and distributing power for the terminal devices.

The multimedia component 706 includes a screen between the terminal device and the user, where the screen provides an output interface. In some embodiments, the screen may include a liquid crystal display (LCD) and a touch panel (TP). If the screen includes a touch panel, the screen can be implemented as a touch screen to receive an input signal from the user. The touch panel includes one or more touch sensors configured to sense touching, sliding and a gesture on the touch panel. Not only may the touch sensor sense a boundary of the action of touch or slide, but also it may detect the duration and pressure associated with the touch or slide operation. In some embodiments, the multimedia component 706 includes a front camera and/or a rear camera. The front camera and/or the rear camera can receive external multimedia data when the terminal device is in an operational mode such as a shooting mode or a video mode. Each of the front camera and the rear camera can be a fixed optical lens system or have a focal length and optical zoom capability.

The audio component 703 is configured to output and/or input an audio signal. For example, the audio component 703 includes a microphone (MIC) that is configured to receive an external audio signal when the terminal device is in an operational mode, such as a calling mode, a recording mode and a voice recognizing mode. The received audio signal may be further stored in the memory 702 or transmitted via the communication component 705. In this embodiment, the voice signal used for the user to perform voice controlling on the terminal device may be collected by the microphone, and then transmitted to the cloud server via the communication component 705. In some embodiments, the audio component 703 also includes a speaker which is configured to output an audio signal. In this embodiment, the prompt information for the user may be played through the speaker.

The I/O interface 708 provides an interface between the processing component 701 and a peripheral interface module, where the peripheral interface module may be a keyboard, a click wheel, a button, or the like. These buttons may include, but are not limited to, a home button, a volume button, a start button and a lock button.

The sensor component 707 includes one or more sensors configured to provide state evaluation of various aspects for the terminal device. For example, the sensor component 707 can detect an open/close state of the terminal device, a relative position of components; for example, the components are a display and a keypad of the terminal device, and the sensor component 707 may also detect a change in position of the terminal device or of a component of the terminal device, the presence or absence of a contact between the user and the terminal device, an orientation or acceleration/deceleration of the terminal device, and a temperature change of the terminal device. The sensor component 707 may also include a proximity sensor configured to detect a presence of a nearby object without any physical contact. The sensor component 707 may also include a light sensor, such as a CMOS or a CCD image sensor, for use in an imaging application. In some embodiments, the sensor component 707 may also include an acceleration sensor, a gyro sensor, a magnetic sensor, a pressure sensor, or a temperature sensor.

The Communication component 705 is configured to facilitate wired or wireless communication between the terminal device and other device. In this embodiment, the communication component 705 is configured to implement interaction between the terminal device and the cloud server. The terminal device may access a wireless network based on a communication standard, such as WiFi, 2G, 3G or 4G, or a combination thereof. In an exemplary embodiment, the communication component 705 receives a broadcast signal or broadcast associated information from an external broadcast management system via a broadcast channel. In an exemplary embodiment, the communication component 705 also includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the terminal device may be implemented through one or more application specific integrated circuits (ASICs), digital signal processors (DSPs), digital signal processing devices (DSPDs), programmable logic devices (PLDs), field programmable gate arrays (FPGA), controllers, micro-controllers, microprocessors, or other electronic components for performing the above methods.

In an exemplary embodiment, a non-transitory computer readable storage medium including an instruction is also provided, such as the memory 702 including instructions executable by the processor 7011 of the terminal device to implement the above methods. For example, the non-transitory computer readable storage medium may be a ROM, a random access memory (RAM), a CD-ROM, a magnetic tape, a floppy disk, and an optical data storage device.

The terminal device provided by this embodiment may be used to implement the technical solutions of the method embodiments corresponding to FIGS. 1 to 3, and the implementation principles and technical effects are similar, which will not be described here again.

Figure 8:
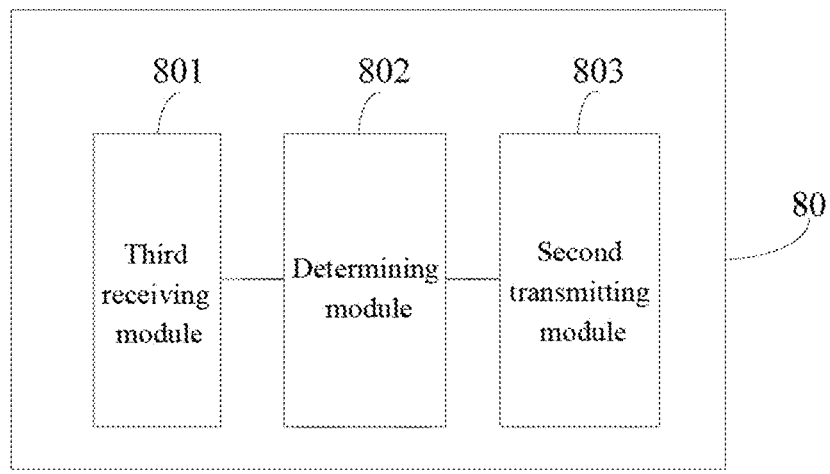
FIG. 8 is a schematic structural diagram of a cloud server provided by an embodiment of the present disclosure.

Embodiments of the present disclosure further provide a cloud server. Referring to FIG. 8, which is only used as an example for illustrating this embodiment of the present disclosure, and the present disclosure is not limited thereto. FIG. 8 is a schematic structural diagram of a cloud server provided by an embodiment of the present disclosure. As shown in FIG. 8, the cloud server 80 provided by this embodiment may include: a third receiving module 801, a determining module 802 and a second transmitting module 803.

The third receiving module 801 is configured to receive voice information transmitted by a terminal device, where the voice information is used to perform voice controlling on the terminal device.

The determining module 802 is configured to determine, according to the voice information, a voice control and a control instruction that match the voice information in a current interface, and generate a corresponding voice control instruction;

The second transmitting module 803 is configured to transmit the voice control instruction to the terminal device, so that the terminal device controls a corresponding voice control of the terminal device to perform an operation according to the voice control instruction.

The cloud server provided by this embodiment may be used to implement the technical solution of the method embodiment corresponding to FIG. 4, and the implementation principles and technical effects thereof are similar, which will not be described here again.

Optionally, the third receiving module is further configured to receive information of all voice controls in the current interface transmitted by the terminal device before receiving the voice information transmitted by the terminal device.

Optionally, the determining module is further configured to determine prompt information according to the information of the voice control in the current interface, and the second transmitting module is further configured to transmit the prompt information to the terminal device, so that the terminal device prompts the user correspondingly.

Figure 9:
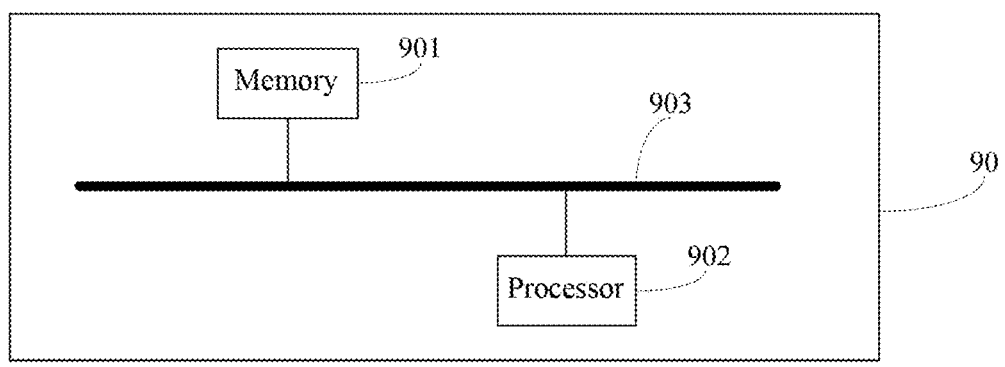
FIG. 9 is a schematic structural diagram of a cloud server provided by another embodiment of the present disclosure.

Embodiments of the present disclosure further provide a cloud server. Referring to FIG. 9, which is only used as an example for illustrating this embodiment of the present disclosure, and the present disclosure is not limited thereto. FIG. 9 is a schematic structural diagram of a cloud server provided by another embodiment of the present disclosure. As shown in FIG. 9, the cloud server 90 provided by this embodiment may include: a memory 901, a processor 902, and a bus 903. Where the bus 903 is configured to implement the connection between the components.

A computer program is stored in the memory 901. When the computer program is executed by the processor 902, the technical solution of the method embodiment corresponding to FIG. 4 may be implemented.

The memory 901 and the processor 902 are, directly or indirectly, electrically connected to achieve data transmission or interaction. For example, those components may be electrically connected to one another via one or more communication buses or signal lines, for example, they may be connected via the bus 903. A computer program, which is used for implementing a vehicle simulation technology data analysis method, is stored in the memory 901, and at least one software function module that can be stored in the memory 901 in a form of software or firmware is included in the memory 901. The processor 902 runs the software program and the module stored in the memory 901 to perform application of various functions and data processing.

The memory 901 may be, but not limited to, a random access memory (RAM), a read only memory (ROM), a programmable read only memory (PROM), an erasable programmable read-only memory (EPROM), an electric erasable programmable read-only memory (EEPROM), and the like. Where the memory 901 is configured to store a program, and the processor 902 executes the program after receiving an execution instruction. Further, the software program and module in the memory 901 may further include an operating system, which may include various software components and/or drivers for managing system tasks (e.g., memory management, storage device control, power management, etc.), and the operating system can communicate with a variety of hardware or software components to provide an operating environment for other software components.

Processor 902 can be an integrated circuit chip with a capacity for signal processing. The processor 902 may be a general-purpose processor, including a central processing unit (CPU), a network processor (NP), and the like. The methods, steps and logical block diagrams disclosed in the embodiments of the present disclosure may be implemented or carried out. The general-purpose processor may be a microprocessor or any conventional processor or the like. It will be understood that the structure of FIG. 9 is merely illustrative, and the structure in actual use may include more or less components than those shown in FIG. 9 or have a different configuration than that shown in FIG. 9. The components shown in FIG. 9 may be implemented using hardware and/or software.

Figure 10:
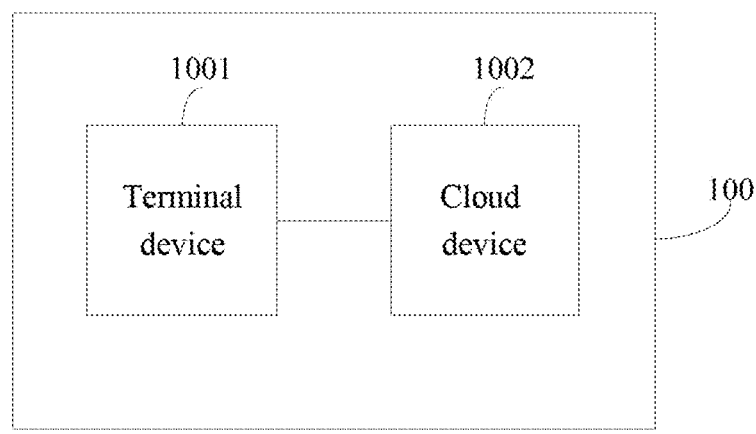
FIG. 10 is a schematic structural diagram of a voice controlling system provided by an embodiment of the present disclosure.

Embodiments of the present disclosure further provide a voice controlling system. Referring to FIG. 10, which is only used as an example for illustrating this embodiment of the present disclosure, and the present disclosure is not limited thereto. FIG. 10 is a schematic structural diagram of a voice controlling system provided by an embodiment of the present disclosure. As shown in FIG. 10, the voice controlling system 100 provided by this embodiment may include: at least one terminal device 1001 and at least one cloud server 1002. Where the terminal device 1001 can implement the technical solutions of the method embodiments shown in FIGS. 1 to 3, and the cloud server 1002 can implement the technical solution of the method embodiment shown in FIG. 4;

Alternatively, the terminal device 1001 may use the terminal device corresponding to the embodiment shown in FIG. 6, and the cloud server 1002 may use the cloud server corresponding to the embodiment shown in FIG. 8;

Alternatively, the terminal device 1001 may use the terminal device corresponding to the embodiment shown in FIG. 7, and the cloud server 1002 may use the cloud server corresponding to the embodiment shown in FIG. 9.

The voice controlling system provided by this embodiment can be used to implement the technical solution of the method embodiment corresponding to FIG. 5, and the implementation principles and technical effects thereof are similar, which will not be described herein again.

Embodiments of the present disclosure further provide a computer readable storage medium having a computer program stored thereon, where the computer program is executed by the processor to implement the technical solution of any one of the above method embodiments.

Finally, it should be noted that the above embodiments are merely illustrative of the technical solutions of the present disclosure, and are not intended to be limiting thereto. Although the present disclosure has been described in detail with reference to the above embodiments, those skilled in the art will understand that technical solutions described in the above embodiments may be modified, or some or all of the technical features may be equivalently replaced, and the modifications or substitutions will not deviate the essence of the corresponding technical solution from the scope of technical solutions of each embodiment of the present disclosure.

What is claimed is:

1. A method for voice controlling, comprising:
   receiving voice information, the voice information being used for a user to perform the voice controlling on a terminal device;
   transmitting the voice information to a cloud server, so that the cloud server generalizes information of all voice controls in a current interface based on semantics, matches the received voice information with the voice controls in the current interface using a fuzzy matching method and determines a voice control in the current interface and a control instruction that match the voice information to generate a corresponding voice control instruction, wherein the voice control corresponds to an operation in an application;
   receiving the voice control instruction transmitted by the cloud server; and
   controlling a voice control of the terminal device indicated in the voice control instruction to perform the operation in the application;
   wherein, before the transmitting the voice information to the cloud server, the method further comprises:
   crawling information of the voice controls in the current interface after an interface of the terminal device is changed;
   transmitting the crawled information of all the voice controls in the current interface to the cloud server.

2. The method according to claim 1, wherein, the crawling the information of the voice controls in the current interface comprises:
   obtaining a control structure tree of the current interface, traversing the control structure tree, and obtaining information of the voice controls in the current interface; wherein the control structure tree comprises the information of all voice controls and information of all non-voice controls in the current interface.

3. The method according to claim 1, wherein, the controlling, according to the voice control instruction, the corresponding voice control of the terminal device to perform the operation comprises:
   determining, according to the voice control instruction, a voice control and a control instruction for performing the instruction, and triggering a corresponding control action.

4. The method according to claim 1, wherein, the method further comprises:
   receiving prompt information transmitted by the cloud server;
   prompting the user correspondingly by means of a voice and/or a text, according to the prompt information.

5. The method according to claim 1, wherein the voice control has a voice interaction capability, and performs a corresponding operation on the voice control through the voice information.

6. The method according to claim 1, wherein the voice information is inputted through voice of the user and without touching a screen of the terminal device by the user.

7. The method according to claim 1, wherein the voice control is a voice button control, which controls, through the voice information, an operation of a button, wherein the operation of the button comprises any one of click, long press, or double click.

8. The method according to claim 1, wherein the voice control is a voice list control, which controls, through the voice information, an operation of a list, wherein the operation of the list comprises any one of scroll up and down, click a specific option, long press, or double click.

9. The method according to claim 1, wherein the voice control is a voice tab control, which controls, through the voice information, switching of tabs.

10. The method according to claim 1, wherein the voice control is a voice custom control, which is a control, provided for a third-party developer, that customizes voice interaction information.

11. A terminal device, comprising:
a memory;
a processor; and
a computer program;
wherein the computer program is stored in the memory, and configured to be executed by the processor to implement the following steps:
receiving voice information, the voice information being used for a user to perform voice controlling on a terminal device;
transmitting the voice information to a cloud server, so that the cloud server generalizes information of all voice controls in a current interface based on semantics, matches the received voice information with the voice controls in the current interface using a fuzzy matching method and determines a voice control in the current interface and a control instruction that match the voice information to generate a corresponding voice control instruction, wherein the voice control corresponds to an operation in an application;
receiving the voice control instruction transmitted by the cloud server; and
controlling a voice control of the terminal device indicated in the voice control instruction to perform the operation in the application;
wherein, before the transmitting the voice information to the cloud server, the method further comprises:
crawling information of the voice controls in the current interface after an interface of the terminal device is changed;
transmitting the crawled information of all the voice controls in the current interface to the cloud server.

12. The device according to claim 11, wherein the computer program is further configured to be executed by the processor to implement the following step:
obtaining a control structure tree of the current interface, traverse the control structure tree, and obtain information of the voice controls in the current interface, wherein the control structure tree comprises the information of all voice controls and information of all non-voice controls in the current interface.

13. The device according to claim 11, wherein the computer program is further configured to be executed by the processor to implement the following step:
determining, according to the voice control instruction, a voice control and a control instruction for performing the instruction, and triggering a corresponding control action.

14. The device according to claim 11, wherein the computer program is further configured to be executed by the processor to implement the following steps:
receiving prompt information transmitted by the cloud server;
prompting the user correspondingly by means of a voice and/or a text, according to the prompt information.

15. A cloud server, comprising:
a memory;
a processor; and
a computer program;
wherein the computer program is stored in the memory, and configured to be executed by the processor to implement the following steps:
receiving voice information transmitted by a terminal device, the voice information being used to perform voice controlling on the terminal device;
determining, according to the voice information, a voice control in a current interface and a control instruction that match the voice information to generate a corresponding voice control instruction, wherein the voice control corresponds to an operation in an application;
transmitting the voice control instruction to the terminal device, so that the terminal device controls a voice control of the terminal device indicated in the voice control instruction to perform the operation in the application;
wherein the computer program is further configured to be executed by the processor to implement the following steps:
generalizing information of all voice controls in the current interface based on semantics, matching the received voice information with the voice controls in the current interface using a fuzzy matching method and determining the voice control in the current interface and the control instruction that match the voice information to generate the corresponding voice control instruction;
wherein the computer program is further configured to be executed by the processor to implement the following step:
receiving information of all voice controls in the current interface transmitted by the terminal device before receiving the voice information transmitted by the terminal device.

16. The cloud server according to claim 15, wherein the computer program is further configured to be executed by the processor to implement the following steps:
determining prompt information according to the information of the voice control in the current interface;
transmitting the prompt information to the terminal device, so that the terminal device prompts the user correspondingly.

17. A method for voice controlling, comprising:
crawling, by a terminal device, information of voice controls in a current interface after an interface of the terminal device is changed;
receiving, by the terminal device, voice information, the voice information being used for a user to perform the voice controlling on the terminal device;

transmitting, by the terminal device, the crawled information of all the voice controls in the current interface and the voice information to a cloud server;
receiving, by the cloud server, the crawled information of all the voice controls in the current interface and the voice information;
generalizing, by the cloud server, the received information of all the voice controls in the current interface based on semantics;
matching, by the cloud server, the received voice information with the voice controls in the current interface using a fuzzy matching method;
determining, by the cloud server, a voice control in the current interface and a control instruction that match the voice information to generate a corresponding voice control instruction, wherein the voice control corresponds to an operation in an application;
transmitting, by the cloud server, the voice control instruction to the terminal device;
receiving, by the terminal device, the voice control instruction; and
controlling, by the terminal device, the voice control of the terminal device indicated in the voice control instruction to perform the operation in the application.

* * * * *